US011078843B2

(12) United States Patent
Roberge et al.

(10) Patent No.: US 11,078,843 B2
(45) Date of Patent: Aug. 3, 2021

(54) THERMAL MANAGEMENT OF A GAS TURBINE ENGINE SHAFT

(71) Applicant: United Technologies Corporation, Farmington, CT (US)

(72) Inventors: Gary D. Roberge, Tolland, CT (US); Jorn Axel Glahn, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 422 days.

(21) Appl. No.: 15/993,675

(22) Filed: May 31, 2018

(65) Prior Publication Data

US 2019/0368419 A1 Dec. 5, 2019

(51) Int. Cl.
*F01D 5/08* (2006.01)
*F02K 3/06* (2006.01)
*F02C 7/18* (2006.01)
*F01D 25/12* (2006.01)

(52) U.S. Cl.
CPC .............. *F02C 7/18* (2013.01); *F01D 5/085* (2013.01); *F01D 25/125* (2013.01); *F02K 3/06* (2013.01); *F05D 2220/323* (2013.01); *F05D 2240/50* (2013.01); *F05D 2240/55* (2013.01); *F05D 2240/60* (2013.01); *F05D 2240/61* (2013.01); *F05D 2260/20* (2013.01); *F05D 2260/4031* (2013.01)

(58) Field of Classification Search
None
See application file for complete search history.

(56) References Cited

U.S. PATENT DOCUMENTS

| 4,941,317 | A | * | 7/1990 | Ivey | F01D 5/085 |
| | | | | | 416/95 |
| 6,155,040 | A | * | 12/2000 | Sasaki | F01D 5/00 |
| | | | | | 60/806 |
| 6,435,812 | B1 | | 8/2002 | DeStefano et al. | |
| 7,493,769 | B2 | | 2/2009 | Jangili | |
| 8,082,727 | B2 | | 12/2011 | Roberge | |

(Continued)

FOREIGN PATENT DOCUMENTS

| FR | 3054858 | * | 8/2016 |
| FR | 3054858 A1 | | 2/2018 |

(Continued)

OTHER PUBLICATIONS

European Search Report for EP Application No. 19174731.0 dated Oct. 16, 2019.

*Primary Examiner* — Todd E Manahan
*Assistant Examiner* — Alyson Joan Harrington
(74) *Attorney, Agent, or Firm* — Carlson, Gaskey & Olds, P.C.

(57) ABSTRACT

A gas turbine engine includes a fan rotor, a compressor section, a combustor section, and a turbine section. The turbine section is positioned downstream of the combustor section. A fan drive turbine in the turbine section, and a shaft connects the fan drive turbine to the fan rotor. An inlet duct is connected to a cooling air source and connected to a cooling compressor downstream of the fan drive turbine. The cooling compressor is connected to an air source, and connected to a turning duct for passing compressed air in an upstream direction through the shaft. A method is also disclosed.

17 Claims, 6 Drawing Sheets

(56) References Cited

U.S. PATENT DOCUMENTS

| | | | | |
|---|---|---|---|---|
| 2002/0108379 A1* | 8/2002 | Akiyama | ............... | F01D 5/085 |
| | | | | 60/806 |
| 2013/0192252 A1 | 8/2013 | Ackermann et al. | | |
| 2018/0051628 A1 | 2/2018 | Roberge | | |
| 2018/0306115 A1* | 10/2018 | Motsch | .................... | F02C 7/18 |

FOREIGN PATENT DOCUMENTS

| | | |
|---|---|---|
| GB | 693682 | 7/1953 |
| GB | 2445083 | 6/2008 |

\* cited by examiner

THERMAL MANAGEMENT OF A GAS TURBINE ENGINE SHAFT

BACKGROUND

This application relates to shaft cooling for a turbine driven shaft in a gas turbine engine.

Gas turbine engines are known and typically include a fan delivering bypass air into a duct as propulsion air. Air is also delivered into a core engine where it passes into a compressor. The air is compressed and delivered into a combustion section where it is mixed with fuel and ignited. Products of this combustion pass downstream over turbine rotors, driving them to rotate. The turbine rotors drive the fan and compressor rotors.

Historically, a turbine rotor has driven a fan rotor through a direct connection and at a common speed. However, more recently, gas turbine engines have been developed wherein a gear reduction is placed between the two such that the fan rotor rotates at a slower speed than the fan drive turbine. With this change, the diameter of the fan can increase, and a bypass ratio or amount of air delivered into the bypass duct compared to the air delivered into the core engine, can increase.

With such changes, the core engine and the turbine sections become smaller. In addition, the torque and heat load applied to shafts connecting the turbine rotors and the compressors and fan rotor also increase.

SUMMARY

In a featured embodiment, a gas turbine engine includes a fan rotor, a compressor section, a combustor section, and a turbine section. The turbine section is positioned downstream of the combustor section. A fan drive turbine in the turbine section, and a shaft connects the fan drive turbine to the fan rotor. An inlet duct is connected to a cooling air source and connected to a cooling compressor downstream of the fan drive turbine. The cooling compressor is connected to an air source, and connected to a turning duct for passing compressed air in an upstream direction through the shaft.

In another embodiment according to the previous embodiment, connection passages in the shaft communicates inner and outer passages in the shaft such that the air, having passed in the upstream location in one of the inner and outer passages is returned in the other of the inner and outer passages in a downstream direction to provide cooling to the shaft.

In another embodiment according to any of the previous embodiments, the turning duct extends to initially pass air downstream of the cooling compressor in a downstream direction, and then turn the air into the upstream direction.

In another embodiment according to any of the previous embodiments, a tube is positioned within the shaft to define the inner and outer passages, and the connection passages extend through the tube to communicate between the inner and outer passages.

In another embodiment according to any of the previous embodiments, a plurality of bearings support the shaft.

In another embodiment according to any of the previous embodiments, bearing outlet passages extend through the shaft. The bearing outlet passages are positioned to provide cooling air to the bearings.

In another embodiment according to any of the previous embodiments, the inlet duct communicates with a bypass duct that is positioned outwardly of a core engine including the compressor section, the combustor section, and the turbine section, and the bypass duct providing the source of air.

In another embodiment according to any of the previous embodiments, the cooling compressor is connected to the shaft to a flexible connection.

In another embodiment according to any of the previous embodiments, the turning duct is positioned relative to a flange at an end of the shaft with an intermediate seal to provide a sealed connection between the duct and the shaft.

In another embodiment according to any of the previous embodiments, the cooling compressor is supported by a bearing which also supports the shaft.

In another embodiment according to any of the previous embodiments, a gear reduction is positioned between the fan drive turbine and the fan rotor.

In another embodiment according to any of the previous embodiments, a plurality of bearings support the shaft.

In another embodiment according to any of the previous embodiments, bearing outlet passages extend through the shaft. The bearing outlet passages are positioned to provide cooling air to the bearings.

In another embodiment according to any of the previous embodiments, a plurality of bearings support the shaft.

In another embodiment according to any of the previous embodiments, bearing outlet passages extend through the shaft. The bearing outlet passages are positioned to provide cooling air to the bearings.

In a featured embodiment, a gas turbine engine includes a fan rotor, a compressor section, a combustor section, and a turbine section. The turbine section is positioned downstream of the combustor section. A fan drive turbine in the turbine section, and a shaft connects the fan drive turbine to the fan rotor, an outer passage within the shaft, and an inner passage within the shaft. There is a means for supplying cooling air to a cooling compressor downstream of the fan drive turbine. There is a means for passing compressed air in an upstream direction through one of the inner and outer passages in the shaft, and providing communication between the inner and outer passages such that the air, having passed in the upstream location may be returned in the other of the inner and outer passages in a downstream direction to provide cooling to the shaft.

In another embodiment according to the previous embodiment, the means for passing compressed air includes a tube positioned within the shaft to define the inner and outer passages, and connection passages extending through the tube to communicate between the inner and outer passages.

In another embodiment according to any of the previous embodiments, the means for supplying cooling air includes an inlet duct that communicates with a bypass duct that is positioned outwardly of a core engine including the compressor section, the combustor section, and the turbine section, and the bypass duct providing the cooling air.

In another featured embodiment, a method of operating a gas turbine engine includes the steps of driving a fan drive turbine in a turbine section, and driving a shaft connecting the fan drive turbine to drive a fan rotor, an outer passage within the shaft, and an inner passage within the shaft. Cooling air is supplied to a cooling compressor downstream of the fan drive turbine, and the cooling compressor is connected to an air source. Compressed air is passed in an upstream direction through one of the inner and outer passages in the shaft, and communicating the inner and outer passages such that the air, having passed in the upstream location is returned in the other of the inner and outer passages in a downstream direction to provide cooling to the shaft.

In another embodiment according to the previous embodiment, the step of initially passing air downstream of the cooling compressor in a downstream direction, and then turning the air into the upstream direction.

These and other features may be best understood from the following drawings and specification.

DETAILED DESCRIPTION

Figure 1:
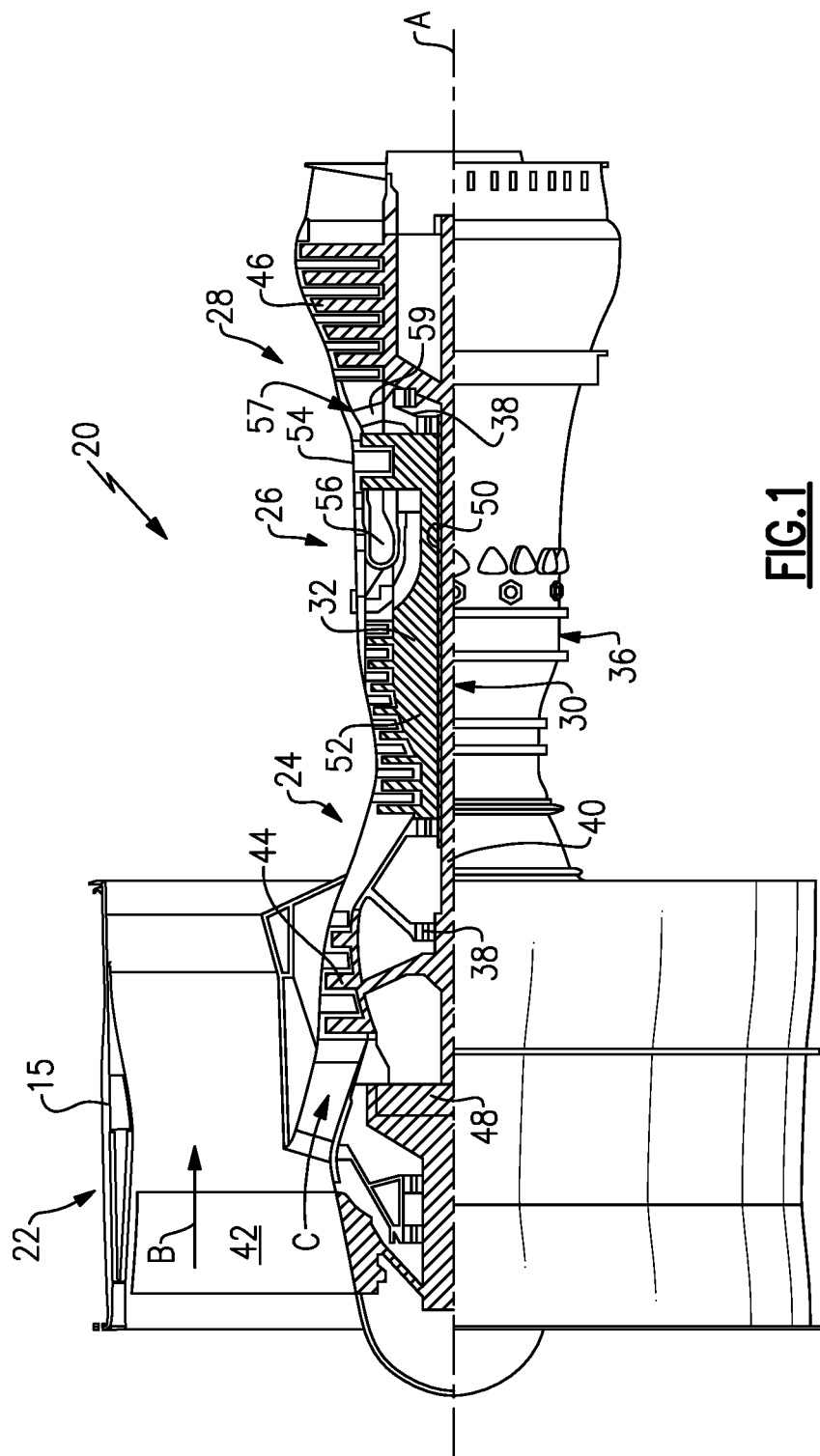
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
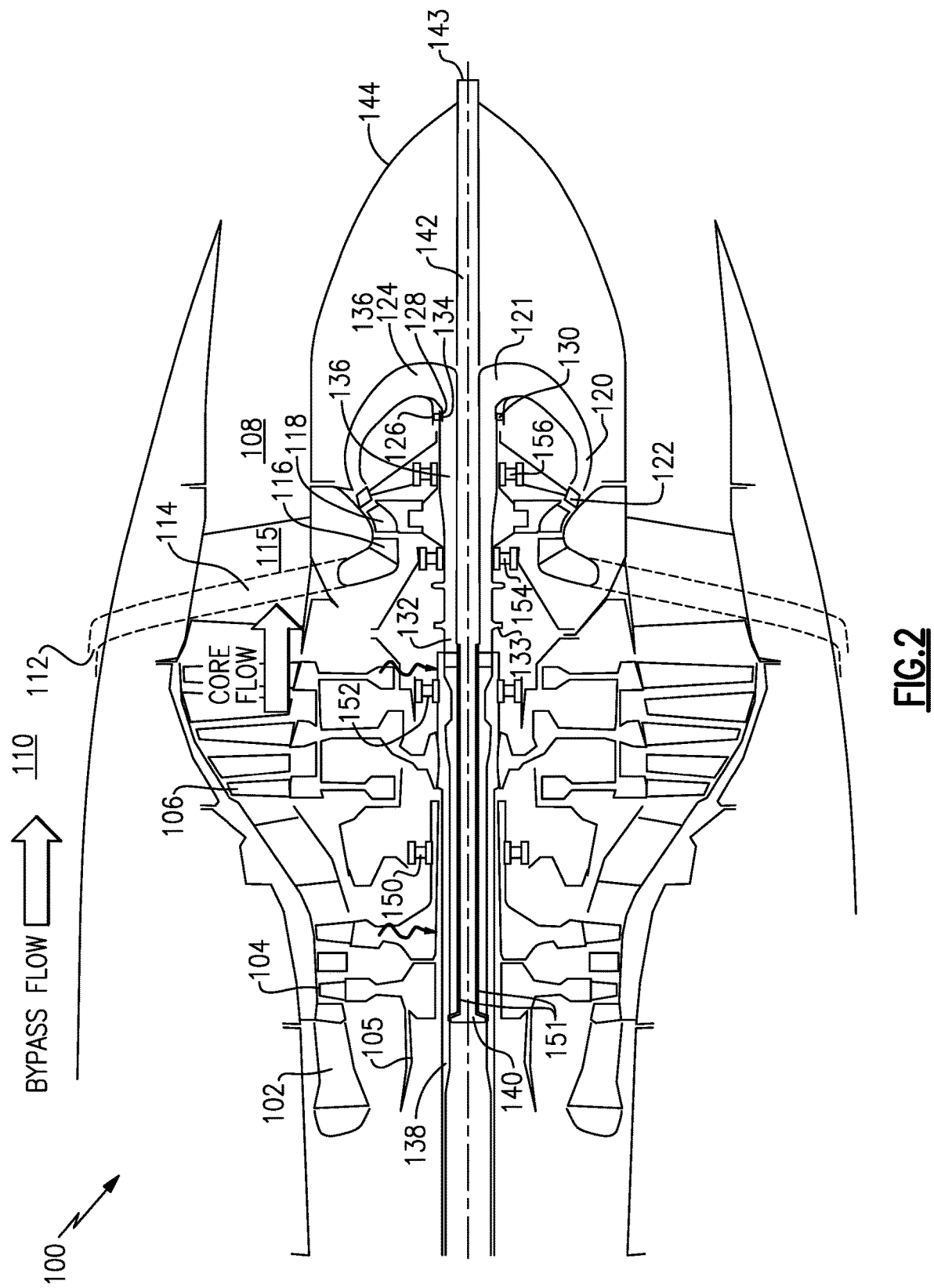
FIG. 2 shows a cooling scheme.

FIG. 2 shows a cooling scheme for engine 100. A combustor 102 is shown along with a high pressure turbine 104 having a shaft 105 rotating outwardly of a low pressure spool and shaft 138.

A fan drive or low pressure turbine 106 rotates with the shaft 138. Exhaust airflow 108 is shown downstream of the fan drive turbine 106. A worker of ordinary skill in this art would recognize that the term "downstream" would mean passing from the compressor (see FIG. 1) through the combustor, across the turbine section, and to the exhaust such as shown at core airflow 108. Upstream is in the opposed direction.

A duct inlet 112 is shown extending into a bypass duct 110. The inlet 112 communicates with the duct 114 passing through a turbine exhaust case 115.

This air passes across a vane 116 and to a cooling compressor 118. The cooling compressor delivers the airflow across a vane 122 and into a discharge duct 120 that takes the airflow initially in a downstream direction, but then turns the cooling airflow at elbow 121 back in an upstream direction. As shown, the duct 120 has end flanges 126 and 128 capturing an end 134 of a downstream shaft portion 132. A seal 130 sits between the portion 134 and the flange 126.

The downstream shaft portion 132 rotates with the shaft 138. Downstream portion 132 may be a flexible input coupling as shown with the undulations at 133. The shaft portion 132 drives the cooling compressor 118. Thus, the air passing into the duct 120 and ultimately into a passage 136, in the shaft portion 132 and the shaft 138, is at a higher pressure than that tapped from the bypass duct 110. As shown, a return tube 140 is positioned within the passage 136. As will be explained, air passes from the elbow 121, upstream through the passage 136, and then radially inwardly into the tube 140 at an upstream location, and then passes back downstream through a tube portion 142. Tube portion 142 is shown venting at 143 at a location associated with the tail cone 144.

With this arrangement, the shaft portion 132 and the shaft 138 are provided with high pressure cooling air that is able to pass along the torturous flow path, as described, and provide adequate cooling.

In addition, bearings 150 and 152 are illustrated along with bearings 154 and 156. Bearings 150 and 152 support shaft 138. The bearings 154 and 156 support the shaft portion 132.

Figure 3:
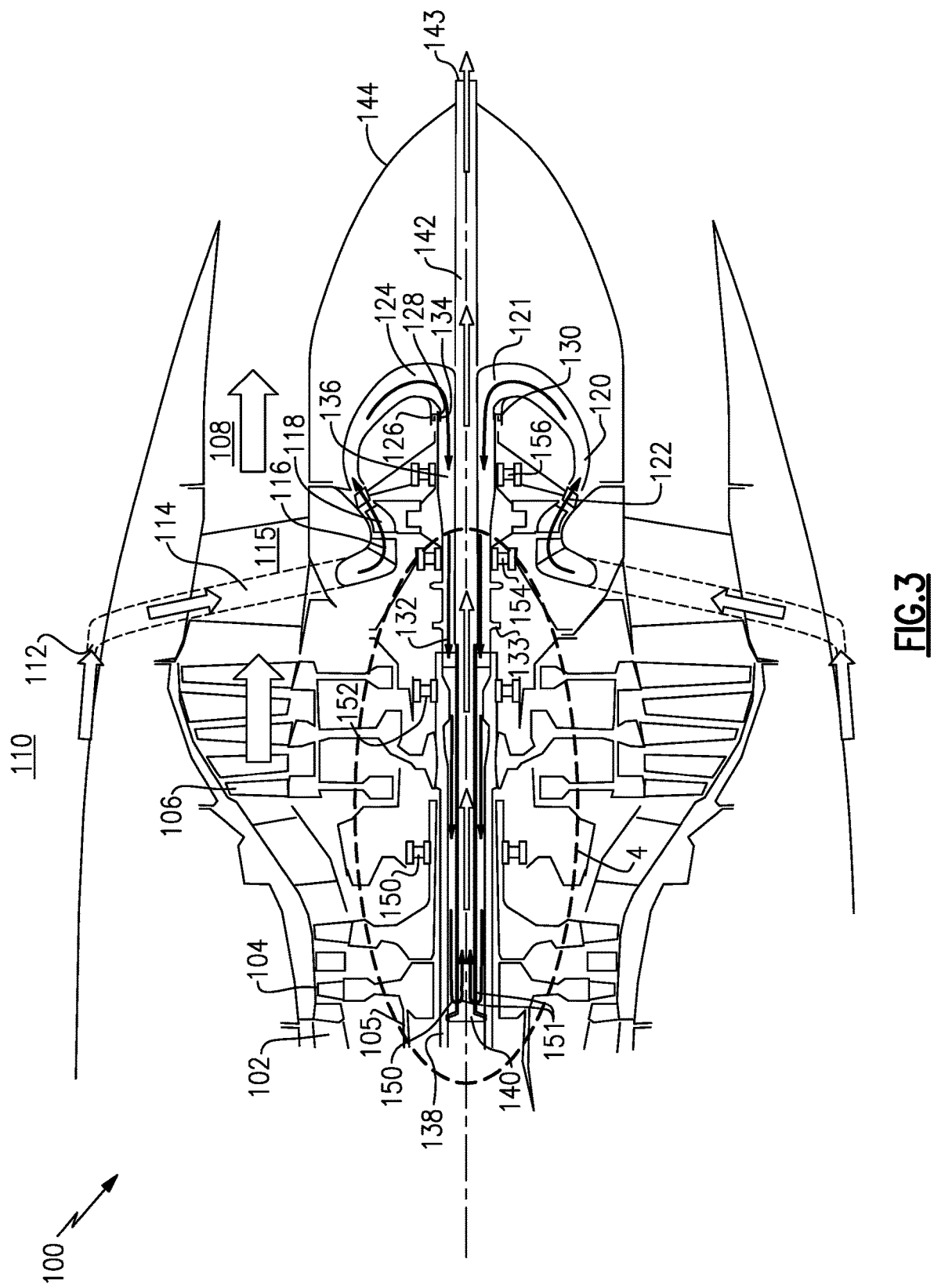
FIG. 3 shows cooling airflow paths through the FIG. 2 engine.

FIG. 3 shows the same basic structure, however, now including arrows which show the cooling air path. Heat passes into the shaft at locations associated with the bearings and the turbine rotors. As can be appreciated, the cooling scheme provided in FIGS. 2 and 3 will provide adequate cooling to those areas.

Figure 4:
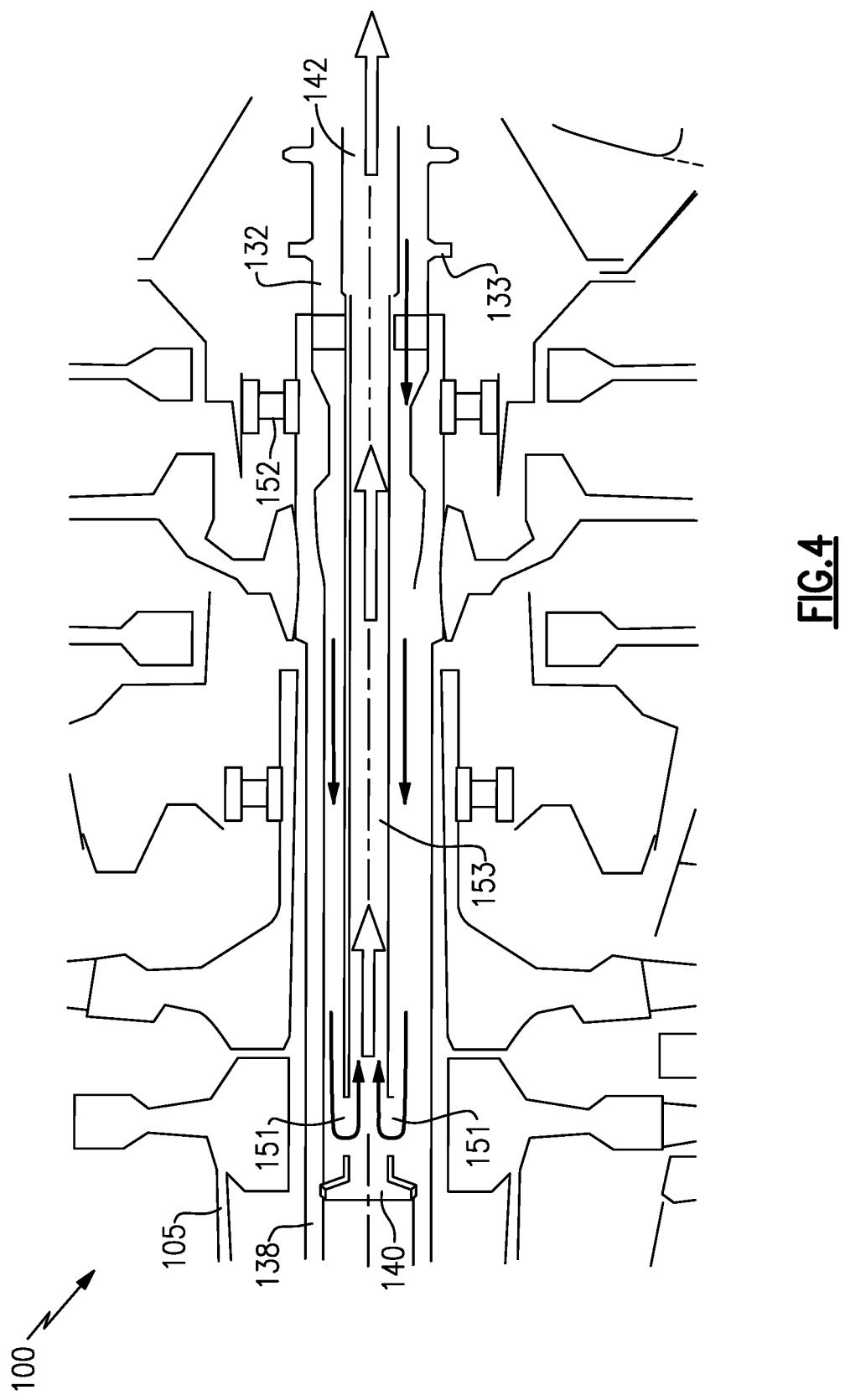
FIG. 4 shows further details of area 4 from FIG. 3.

FIG. 4 shows a further detail of area 4 from FIG. 3. As shown, the tube 140 has passages 151 allowing the cooling air passing upstream to the passage 136 to turn radially inwardly into the tube 140 through openings 151 into the interior 153 of the tube and pass to downstream locations 142.

Figure 5:
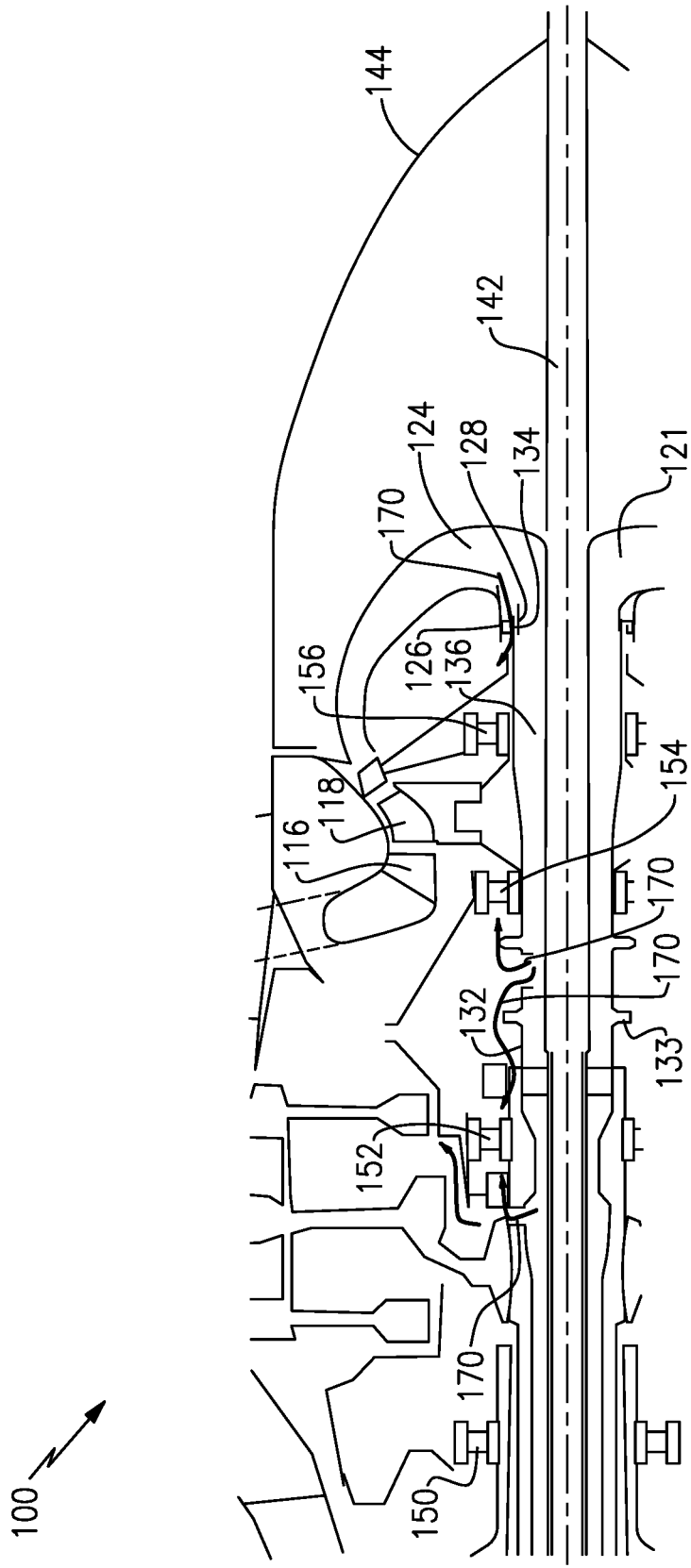
FIG. 5 shows another potential feature.

FIG. 5 shows an alternative feature wherein the shafts 132/138 outwardly of the passage 136 may be provided with a plurality of cooling holes 170 to provide cooling to the location of the bearings 150, 152, 154, 156. By providing bearing cooling airflow at the high pressures achieved with the cooling compressor 118, buffering and thermal conditioning of the bearings will be provided.

Figure 6:
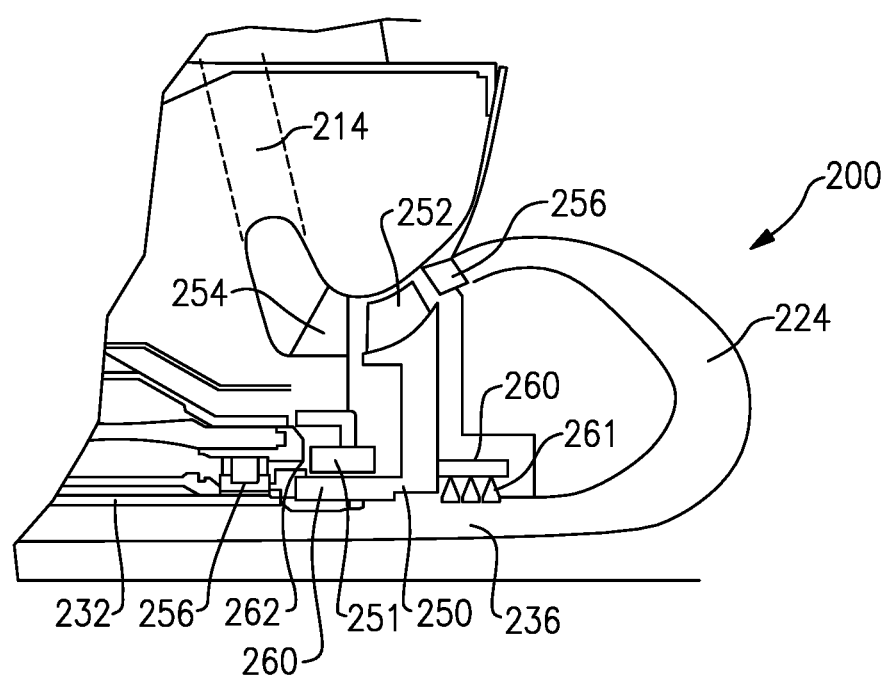
FIG. 6 shows an alternative embodiment.

FIG. 6 shows an alternative embodiment 200 wherein the duct 214 supplies air across a vane 254, a cooling compressor 252, a vane 256, and into the duct 224. Air in the duct 224 will communicate with a passage 236 and will provide cooling to the shaft as in the above embodiment. An end 250 of the rotor is provided adjacent a seal 251 and a seal 261 sealing on a downstream end 260 of the shaft. Seal 261 may be a brush seal, although other type seals are contemplated. By locating the compressor rotor radially inwardly, the rear bearings 256 are associated not only with the rear shaft 232, but also with the compressor rotor 252.

One could define a gas turbine engine coming within this disclosure as having a fan rotor, a compressor section, a combustor section, and a turbine section. The turbine section is positioned downstream of the combustor section. There is a fan drive turbine in the turbine section, and a shaft connects the fan drive turbine to the fan rotor. There is outer passage within the shaft, and an inner passage within the shaft. There is a means for supplying cooling air to a cooling compressor downstream of the fan drive turbine. There is also a means for passing compressed air in an upstream direction through one of the inner and outer passages in the shaft, and communicate the inner and outer passages such that the air, having passed in the upstream location may be returned in the other of the inner and outer passages in a downstream direction to provide cooling to the shaft.

A method of operating a gas turbine engine includes the steps of driving a fan drive turbine in a turbine section. Also, driving a shaft connecting the fan drive turbine to drive a fan rotor, an outer passage within the shaft, and an inner passage within the shaft. Supplying cooling air to a cooling compressor downstream of the fan drive turbine. Suppling compressed air in an upstream direction through one of the inner and outer passages in the shaft. The inner and outer passages communicate such that the air, having passed in the upstream location is returned in the other of the inner and outer passages in a downstream direction to provide cooling to the shaft.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a fan rotor, a compressor section, a combustor section, and a turbine section, said turbine section being positioned downstream of said combustor section;
   a fan drive turbine in said turbine section, and a shaft connecting said fan drive turbine to said fan rotor, said shaft also driving a cooling compressor;
   an inlet duct connected to a cooling air source and connected to provide air to said cooling compressor downstream of said fan drive turbine, and said cooling compressor is connected to a turning duct for passing compressed air from said cooling compressor in an upstream direction through said shaft; and
   wherein there being connection passages in said shaft to provide communication between inner and outer passages in said shaft such that the compressed air, having passed in said upstream direction through said shaft in one of said inner and outer passages is returned in the other of said inner and outer passages in a downstream direction to provide cooling to said shaft.

2. The gas turbine engine as set forth in claim 1, wherein said turning duct extending to initially pass the compressed air downstream of said cooling compressor in said downstream direction, and then turn the compressed air into the upstream direction.

3. The gas turbine engine as set forth in claim 2, wherein a tube is positioned within said shaft to define said inner and outer passages, and said connection passages extend through said tube to communicate between said inner and outer passages.

4. The gas turbine engine as set forth in claim 3, wherein a plurality of bearings support said shaft.

5. The gas turbine engine as set forth in claim 4, wherein bearing outlet passages extend through said shaft, said bearing outlet passages positioned to provide cooling air to said bearings.

6. The gas turbine engine as set forth in claim 1, wherein said inlet duct communicates with a bypass duct that is positioned outwardly of a core engine including said compressor section, said combustor section, and said turbine section, and said bypass duct providing said cooling air source.

7. The gas turbine engine as set forth in claim 1, wherein said cooling compressor is connected to said shaft by a flexible shaft portion having undulations.

8. The gas turbine engine as set forth in claim 1, wherein a gear reduction is positioned between said fan drive turbine and said fan rotor.

9. The gas turbine engine as set forth in claim 8, wherein a plurality of bearings support said shaft.

10. The gas turbine engine as set forth in claim 9, wherein bearing outlet passages extend through said shaft, said bearing outlet passages positioned to provide cooling air to said bearings.

11. The gas turbine engine as set forth in claim 1, wherein a plurality of bearings support said shaft.

12. The gas turbine engine as set forth in claim 11, wherein bearing outlet passages extend through said shaft, said bearing outlet passages positioned to provide cooling air to said bearings.

13. A method of operating a gas turbine engine comprising the steps of:
   driving a fan drive turbine in a turbine section, and driving a shaft connecting said fan drive turbine to drive a fan rotor, an outer passage within said shaft, and an inner passage within said shaft;
   supplying cooling air into an inlet duct and then to a cooling compressor driven by said shaft downstream of said fan drive turbine, and passing compressed air from the cooling compressor in an upstream direction through one of said inner and outer passages in said shaft, and providing communication between said inner and outer passages such that the compressed air, having passed in said upstream direction is returned in the other of said inner and outer passages in a downstream direction to provide cooling to said shaft; and
   said one of said inner and outer passages being said outer passage, with the other of said inner and outer passages being said inner passage.

14. The method as set forth in claim 13, including the step of initially passing the compressed air downstream of said cooling compressor in a downstream direction, and then turning the compressed air into the upstream direction.

15. A gas turbine engine comprising:
   a fan rotor, a compressor section, a combustor section, and a turbine section, said turbine section being positioned downstream of said combustor section;
   a fan drive turbine in said turbine section, and a shaft connecting said fan drive turbine to said fan rotor, said shaft also driving a cooling compressor;
   an inlet duct connected to a cooling air source and connected to provide air to said cooling compressor downstream of said fan drive turbine, and said cooling compressor is connected to a turning duct for passing compressed air from said cooling compressor in an upstream direction through said shaft;
   connection passages in said shaft to provide communication between inner and outer passages in said shaft such that the compressed air, having passed in said upstream direction through said shaft in one of said inner and outer passages is returned in the other of said inner and outer passages in a downstream direction to provide cooling to said shaft;
   said turning duct extending to initially pass the compressed air downstream of said cooling compressor in said downstream direction, and then turn the compressed air into the upstream direction; and
   wherein a tube is positioned within said shaft to define said inner and outer passages, and said connection passages extend through said tube to communicate between said inner and outer passages, with compressed air downstream of said turning duct intially passing through said outer passage in said upstream direction, and then turning into said inner passage to return in said downstream direction.

16. The gas turbine engine as set forth in claim 15, said turning duct has a downstream end with an end flange capturing an end of said shaft, with a seal sitting between said end flange and said shaft.

17. The gas turbine engine as set forth in claim 1, wherein said turning duct has a downstream end with an end flange capturing an end of said shaft, with a seal sitting between said end flange and said shaft.

* * * * *